Feb. 21, 1950   J. C. HAGGART, JR   2,498,489
METHOD OF MOLDING REFLECTOR DEVICES
Original Filed Oct. 3, 1947   3 Sheets-Sheet 1
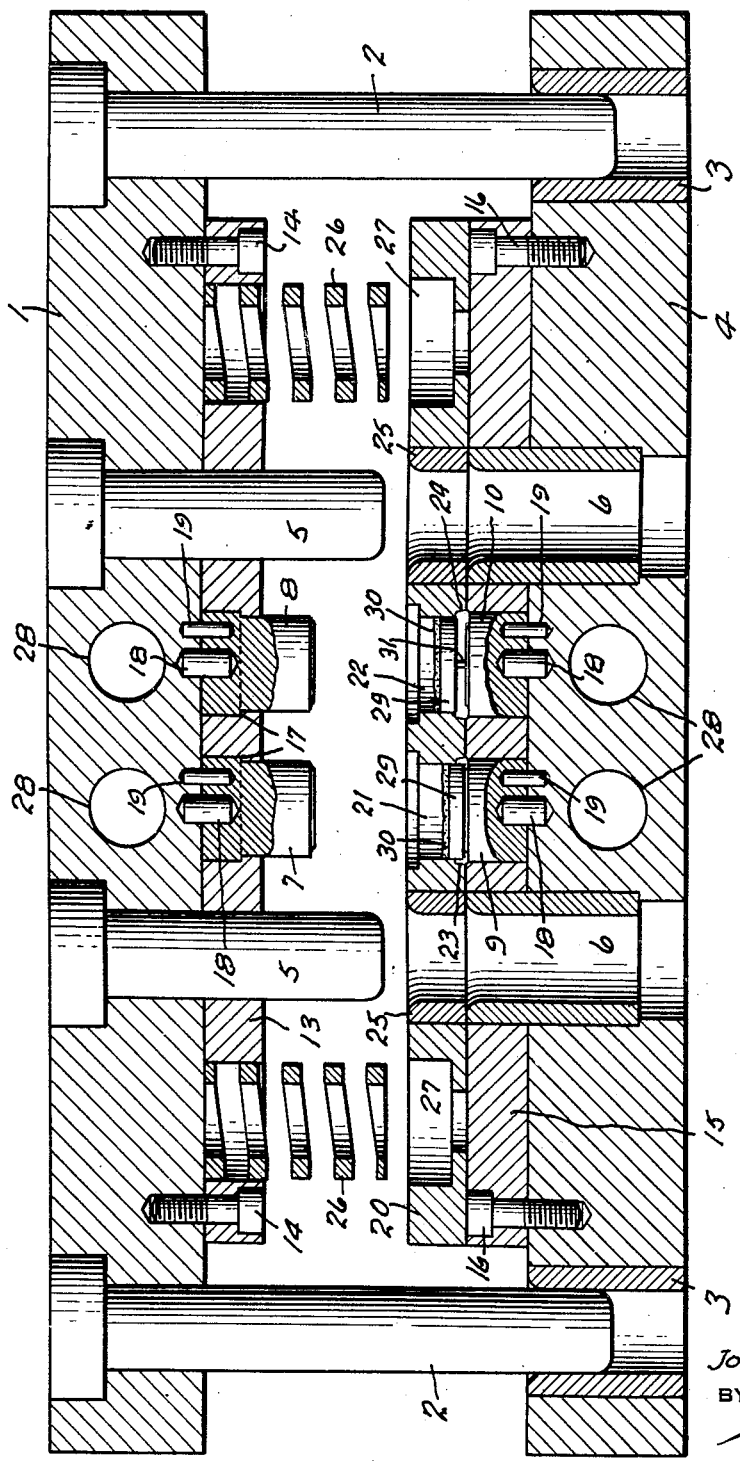
INVENTOR
John C. Haggart, Jr.
BY
ATTORNEY Feb. 21, 1950     J. C. HAGGART, JR     2,498,489
METHOD OF MOLDING REFLECTOR DEVICES
Original Filed Oct. 3, 1947     3 Sheets-Sheet 2
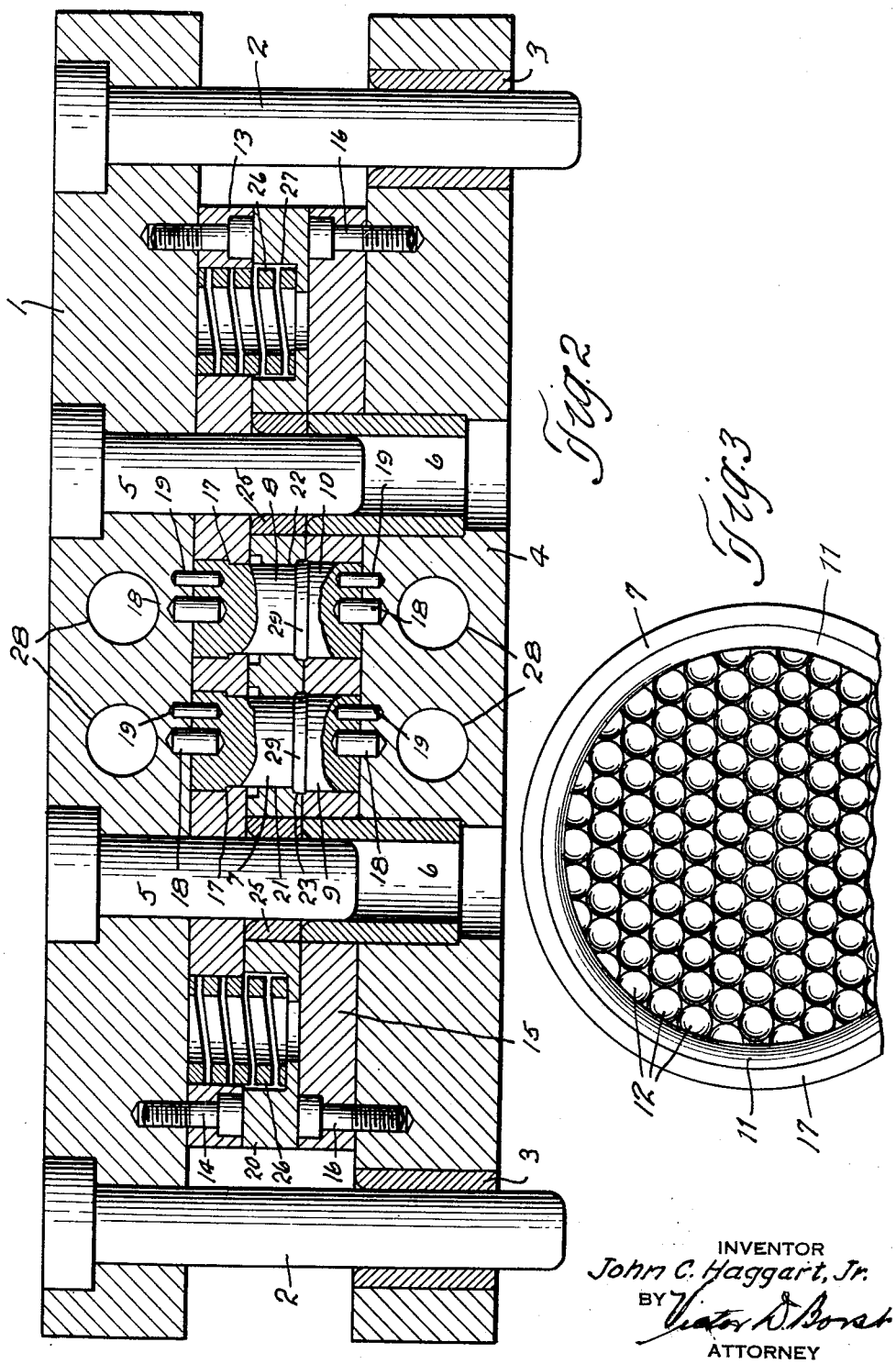
INVENTOR
*John C. Haggart, Jr.*
BY
ATTORNEY Feb. 21, 1950     J. C. HAGGART, JR     2,498,489
METHOD OF MOLDING REFLECTOR DEVICES
Original Filed Oct. 3, 1947                3 Sheets-Sheet 3
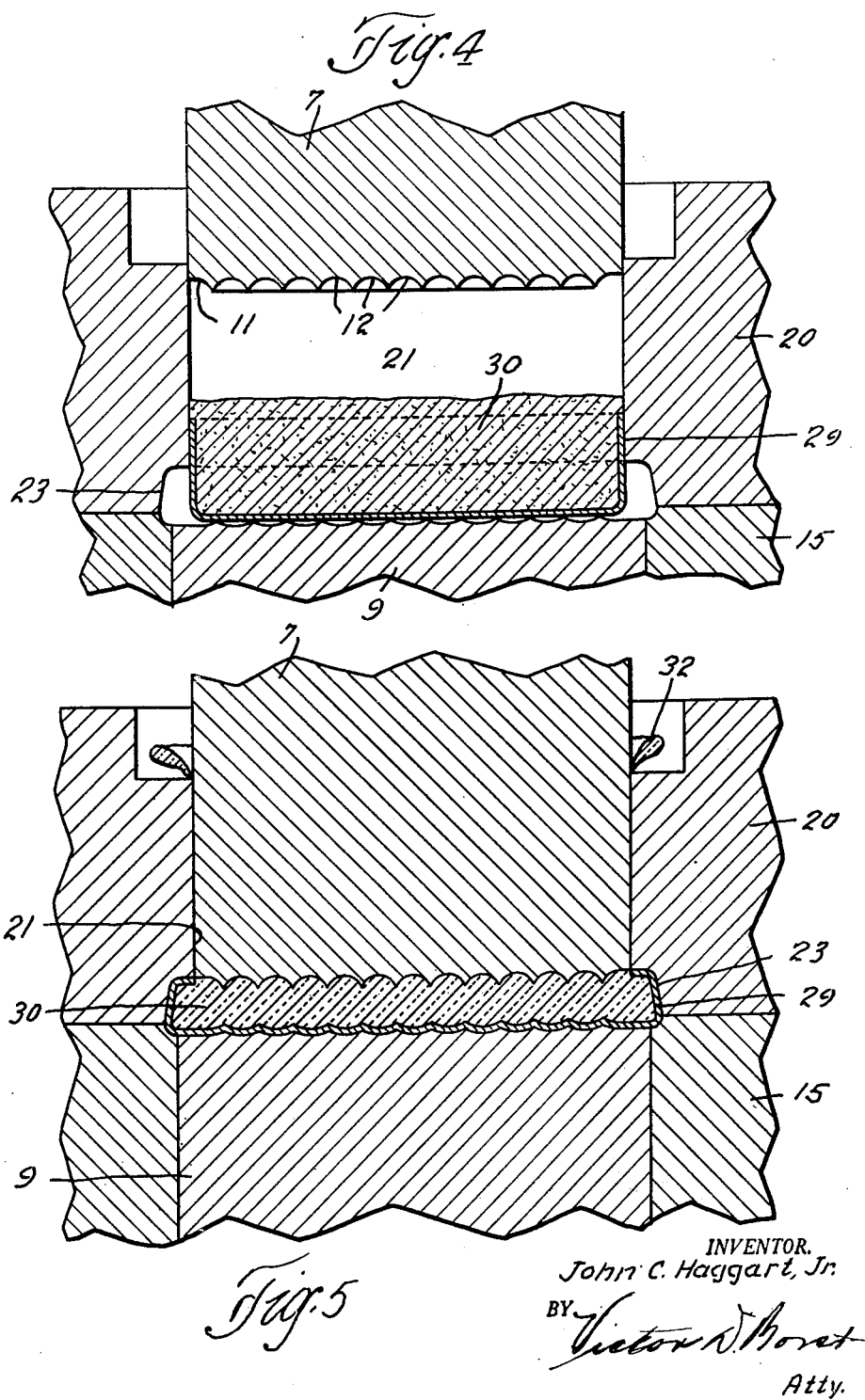
INVENTOR.
John C. Haggart, Jr.
BY
Atty.

Patented Feb. 21, 1950

2,498,489

UNITED STATES PATENT OFFICE 2,498,489

METHOD OF MOLDING REFLECTOR DEVICES

John C. Haggart, Jr., Los Angeles, Calif.

Original application October 3, 1947, Serial No. 777,693. Divided and this application February 10, 1948, Serial No. 7,315

3 Claims. (Cl. 18—59)

This application is a division of application Serial No. 777,693, filed October 3, 1947, now Patent No. 2,479,350.

The invention relates to the forming of reflector units of the type which within a considerable angle of incidence will return incident light substantially in the direction of incidence. Such units are variously referred to as retro-directive and as auto-collimating units. Functionally and structurally they fall into the two categories of central triple reflector units and lens-reflector units. It is with units of the latter category that this invention has especial utility.

More particularly, this invention has application to the problems that arise in connection with the forming of disc units, that is, members that resemble discs, in that their thickness is considerably less than their other dimensions and they are composed of a plurality of contiguous small reflective elements, the effect of which at any substantial distance is to integrate the individual luminous areas into one composite luminous area comprising all of the elements.

Such discs, for mounting purposes, commonly have to be provided with a sheet metal housing and, for satisfactory results, it is necessary that the housing exclude moisture from its interior and behind the disc. Also, since disc units are commonly molded from plastic material which is more yielding than glass, it has been a problem to apply the housing to the unit in a moisture proof manner without warping the unit and impairing its optical properties.

Discs of the lens-reflector type commonly have their back faces silvered and moisture is particularly deleterious to such backing. This invention permits of dispensing with the silver on the back face and assures an hermetic seal between the housing and disc without the presence of any strains to warp the disc.

To effect this result, this invention contemplates molding the disc in the housing under such temperature and pressure conditions that the plastic is caused to fill the housing as the housing is being shaped to the proper conformation. This simultaneous shaping of the housing and molding the plastic into the housing as it is shaped, eliminates any strains upon the disc by the housing. Also the dies or mold elements produce the contiguous lenticular faces on the plastic disc and axially aligned reflector convexities on the housing, with the result that the housing itself serves as the reflector and dispenses with the need for silvering.

Specifically the invention contemplates placing suitable cup shape metallic housings in mold cavities and depositing plastic molding powder in the housings and simultaneously heating the powder to a fusing temperature and subjecting the housing and its contents to pressure between properly shaped dies. The mold cavity and the dies are so designed that the pressure enlarges the diameter of the housing while crimping the edge over the plastic molded contents and forming the reflecting nodules in the bottom of the housing. The pressure is retained until the plastic has set, and if desired, the mold may be artificially cooled to expedite the setting.

A suitable apparatus for carrying out the invention is illustrated in the drawings, in which Fig. 1 is a cross section with some of the parts in full or partial elevation, showing the mold open;

Fig. 2 is a similar view of the mold closed;

Fig. 3 is an end elevation of one of the upper dies on enlarged scale;

Fig. 4 is a sectional detail on the same scale as Fig. 3 of one of the mold cavities and immediately adjacent parts, showing the mold open and the unit parts in position, and Fig. 5 is a similar view showing the mold closed and the unit formed.

The press elements for receiving and operating the mold may be of any standard construction and are not shown. It will be assumed that the lower platen and the parts carried thereby are mounted on the bed of a press, and that the upper platen and parts carried thereby are fastened to the vertically reciprocating ram of the press.

In the plane of the section of the drawings, the mold is shown as having two mold cavities and a corresponding number of pairs of cooperative dies or mold inserts, but it will be understood that the mold may have one or any greater number of cavities within practicable limits.

The upper platen 1 carries guide pins 2 which are long enough to remain in the bushings 3 of the guide openings in the lower platen 4 in the open position of the mold, as shown in Fig. 1. The upper platen 1 also carries shorter guide pins 5 which are clear of the lower platen and the mold plate when the mold is open, but which operate to position the mold plate, as will presently appear, and to enter the bushings 6 in guide openings in the lower platen when the mold is closed.

The upper platen carries die members or mold inserts 7 and 8, and the lower platen carries respectively opposing and cooperative die members 9 and 10. The mold faces of these dies have a narrow annular marginal depressed portion 11, and inside of this portion 11 the faces are formed into a plurality of small contiguous spherical depressions 12. As will be seen, the lower dies 9 and 10 are slightly larger in diameter than the upper dies 7 and 8, the marginal portion 11 being that much wider in the lower dies than in the upper dies.

To attach the dies to their platens, retainer plates are used. The upper retainer plate 13 is secured to the underside of the platen 1 by screws 14, and the lower retainer plate 15 is secured on the top face of the platen 4 by screws 16. The upper dies 7 and 8 are enlarged at their upper ends to provide a shoulder 17 which rests upon a corresponding retaining shoulder in the plate 13. All four of the dies shown have axial pins 18 which extend into recesses in the retainer plates and are termed indexing pins in that they permit the dies to be adjusted angularly so that the depressions 12 of the upper and lower dies of each cooperative pair are in mutual opposition. Locking pins 19 are disposed so as to hold the dies in such relative angular positions.

Since the lower dies 9 and 10 rest by gravity upon the bottom retainer plate, retaining shoulders such as the shoulders 17 are unnecessary and are not provided.

The mold plate 20 which contains the mold cavities 21 and 22, rests loosely upon the retainer plate 15. The length of the lower dies 9 and 10 is such that their molding faces are substantially flush with the retainer plate 15 and the mold cavities in the plate 20 are adapted to register with the lower dies. The mold cavities are bores through the mold plate which for most of their length are of a size to receive and fit over the upper dies 7 and 8. For convenience, they may be enlarged at their upper or admission end, as shown. At their bottoms these cavities are enlarged and slightly tapered, and it is these enlarged portions 23 and 24, respectively, of the cavities 21 and 22 which, in cooperation with the mold faces of the dies 9 and 10, form the final mold cavity. Guide holes with bushings 25 are disposed and proportioned so that they receive the guide pins 5 as the mold closes and exactly locate the mold plate with the mold cavities in register with the dies.

Coiled springs 26 depend from the retainer plate 13 and coact with the mold plate 20, this plate preferably being provided with recesses 27 disposed to receive the lower ends of the respective springs as the mold closes. The springs engage the bottoms of their recesses ahead of the entrance of the upper dies into the mold cavities, and hence the springs bear upon the mold plate during all of the molding operation and until the upper dies are substantially withdrawn from the lower dies and the molded units.

Each of the platens is shown as provided with two passages 28 through which may be circulated means to heat and to cool the platens. For example, they may be connected to a steam supply to heat the dies for molding, and then to a water supply to cool the dies to accelerate the setting of the molded unit.

In use, a metallic, cup shape member 29 of the outside diameter of the upper die and hence of the size of cavities 21 and 22, is set down in each of these cavities as shown in Fig. 1 and the cup is then filled with a plastic powder 30, a slight excess of the powder being provided. The cup may be of aluminum which is bright at least on the inside so as to constitute a reflecting surface. Such a cup is adapted to serve as the housing for the finished unit.

For the purpose of piercing holes in the bottom of the reflector cup, which may be required for attachment of the unit to its support, for example, to clothing or to a sign post, one or more pins 31 may be inserted in the lower half of the mold, one only being shown in the illustrated embodiment.

With the mold loaded as shown in Fig. 1 and the dies heated, the mold is closed to the position shown in Fig. 2. As the dies close, the annular portions 11 of dies 7 and 8 first engage the top edge of the cups 29, and either immediately, as in cavity 21, or after perforation by the insert or inserts 31, as in cavity 22, the upper dies coact with their lower dies to exert axial pressure upon the cups and their contents. This pressure causes the bottom of the cups to conform to the shape of the molding faces of the lower dies while imparting the shape of the molding faces of the upper dies to the plastic which has been fused by the heat and is molded into the cup. The continued pressure causes the cups to expand into the cavity portions 23 and 24 which action crimps the edge of the cups inward over the margins of the units. The excess plastic will escape around the die 7 and if sufficient will rise into the enlarged upper end of the cavity 21 as flash 32.

A unitary structure consisting of the housing and plastic disc is thus molded, and since the plastic is molded in the housing, it is free of strains and there is no tendency to warp. The dies are left together and are cooled by running water through the passages 28 until the molded plastic is set. Then the ram is raised and the mold is parted, whereupon the mold plate 20 is lifted off and unloaded. The mold is then ready to repeat the operation.

The nature of the powder used for such molding operations is well known, it being a thermoplastic, synthetic resin, of which Lucite may be mentioned as an example, which when charged into a mold and subjected to heat and pressure, is changed into an infusible, rigid, molded article.

While aluminum has been mentioned as the metal of the reflector cups, it will, of course, be understood that other metals such as nickel, for example, may be employed. Also progress has been made in the art of spraying or otherwise applying silver on metals, and while it is contemplated that the aluminum or other metal, suitably polished, will suffice as a reflector, the inner surface of the cup may be treated by silvering to improve its reflective properties.

Due to the difference in coefficient of expansion between the plastic disc and the metal housing, there will at atmospheric temperatures be a small space between the side wall of the disc and the housing, which, if permitted to exist, would provide ingress for atmospheric moisture and cause oxidation of the reflecting surface. This invention contemplates a step which will result in the permanent sealing of the joint between the plastic and metal, and incidentally as an expedient for controlling the color of the reflector unit.

This step consists in introducing a proper medium to fill the space, and for this purpose a silicon compound of the class known as silicones, and particularly a silicone fluid of suitable viscosity is used.

The preferred method of introducing the silicone into the annular space between the side wall of the plastic and its housing, is to immerse the unit just as it comes from the mold into the silicone which is reduced to a temperature at or below freezing. At the relatively high temperature of the unit as it is removed from the mold, the plastic is expanded and snugly fits the cup side wall. As the unit is chilled, the plastic contracts more than the metal wall, leaving a void into which the silicone enters, and the silicone remains as a seal in that space. A film of the silicone will remain on the exposed surface of the plastic and is substantially permanent since it maintains its viscosity beyond the temperature ranges which such units encounter in use.

An incidental advantage of such use of a silicone is the fact that dyes may be added to the silicone and reflectors of various colors be thereby obtained.

Other ways and means of carrying out the process will occur to those skilled in the art, and the invention may be otherwise variously embodied within the scope of the following claims.

What is claimed is:

1. The method of forming auto-collimating reflecting disc units of the single refracting lens-reflector type having a plurality of individual lens-reflector elements integrally joined and enclosed in a housing without strain upon the disc, consisting in completely filling a metallic cup with loose powdered fusible thermoplastic material, heating the material to a fusing temperature, axially compressing the cup and contents at said temperature between two dies and causing the cup to expand substantially in diameter, and restraining the upper portion of the side wall of the cup to its original size during said expansion thereby causing the said upper portion to be crimped inward over the molded plastic disc in the cup, and maintaining the pressure until the material is set.

2. The method as defined in claim 1 in which the axial pressure is applied to the top edge of the cup as well as to the said material.

3. The method as defined in claim 1 in which the restraint to the side wall of the cup is in the plane of the top surface of the finished unit.

JOHN C. HAGGART, Jr.

REFERENCES CITED

The following references are of record in the file of this patent:

UNITED STATES PATENTS

| Number | Name | Date |
|---|---|---|
| 304,252 | Beher | Aug. 26, 1884 |
| 610,630 | Miller | Sept. 13, 1898 |
| 1,626,278 | Goodman | Apr. 26, 1927 |
| 1,856,415 | Halperin | May 3, 1932 |
| 2,158,044 | Haller | May 9, 1939 |
| 2,260,456 | Johnson | Oct. 28, 1941 |

OTHER REFERENCES

Scientific American, January 1945, page 28 (Copy in Div. 38.)